United States Patent
Sagalovskiiy et al.

(10) Patent No.: US 9,322,399 B2
(45) Date of Patent: Apr. 26, 2016

(54) ENCAPSULATED ROTOR FOR PERMANENT MAGNET SUBMERSIBLE MOTOR

(75) Inventors: Vladimir Iosifovich Sagalovskiiy, Moscow (RU); Andreiy Vladimirovich Sagalovskiiy, Moscow (RU); Ol'ga Nikolaevna Gmyzina, Moscow (RU)

(73) Assignee: Oilfield Equipment Development Center Limited, Victoria (SC)

( * ) Notice: Subject to any disclaimer, the term of this patent is extended or adjusted under 35 U.S.C. 154(b) by 419 days.

(21) Appl. No.: 13/557,455

(22) Filed: Jul. 25, 2012

(65) Prior Publication Data

US 2014/0028119 A1    Jan. 30, 2014

(51) Int. Cl.
| | |
|---|---|
| *H02K 1/27* | (2006.01) |
| *H02K 1/28* | (2006.01) |
| *H02K 5/08* | (2006.01) |
| *H02K 5/132* | (2006.01) |
| *F04B 17/03* | (2006.01) |
| *F04B 47/06* | (2006.01) |

(52) U.S. Cl.
CPC ............... *F04B 17/03* (2013.01); *F04B 47/06* (2013.01); *H02K 1/278* (2013.01); *H02K 1/28* (2013.01); *H02K 5/08* (2013.01); *H02K 5/132* (2013.01); *Y10T 29/49009* (2015.01)

(58) Field of Classification Search
CPC ............ H02K 1/28; H02K 1/30; H02K 5/08; H02K 5/132
USPC ........ 310/43, 156.12, 156.13, 156.25, 156.28
IPC ....................................... H02K 1/28
See application file for complete search history.

(56) References Cited

U.S. PATENT DOCUMENTS

| | | | | | |
|---|---|---|---|---|---|
| 3,231,287 | A | * | 1/1966 | Stuempfig | ............ 277/436 |
| 4,594,525 | A | * | 6/1986 | Stokes | .......... 310/156.13 |
| 4,954,736 | A | * | 9/1990 | Kawamoto et al. | ...... 310/156.21 |
| 4,973,872 | A | * | 11/1990 | Dohogne | ........... 310/156.28 |
| 5,708,337 | A | | 1/1998 | Breit et al. | |
| 6,603,232 | B2 | | 8/2003 | Van Dine et al. | |
| 6,933,645 | B1 | | 8/2005 | Watson | |
| 7,042,126 | B2 | | 5/2006 | Sidey et al. | |
| 7,239,098 | B2 | | 7/2007 | Masino | |
| 7,479,756 | B2 | | 1/2009 | Kasunich et al. | |
| 7,666,013 | B1 | | 2/2010 | Kopecky et al. | |
| 8,076,898 | B2 | | 12/2011 | Sagalovskiiy et al. | |
| 2007/0096571 | A1 | * | 5/2007 | Yuratich | ................ 310/87 |
| 2010/0060210 | A1 | | 3/2010 | Liu et al. | |
| 2010/0237817 | A1 | | 9/2010 | Liu et al. | |
| 2013/0043034 | A1 | * | 2/2013 | Drablier et al. | ............ 166/338 |

FOREIGN PATENT DOCUMENTS

| | | | |
|---|---|---|---|
| CA | 2783842 | A1 | 1/2014 |
| JP | H11-146583 | A | 5/1999 |
| JP | 2003-259578 | A | 9/2003 |
| RU | 2244370 | C1 | 1/2005 |
| RU | 2309510 | C2 | 10/2007 |
| RU | 107001 | U1 | 7/2011 |

OTHER PUBLICATIONS

Schey, John A.—Introduction to Manufacturing Processes, Second Edition, McGraw-Hill, Inc., copyright 1987, 1977, pp. 414-418.
Canadian Office Action for CA Application 2,783,842, dated May 7, 2014.
Canadian Office Action dated Jul. 6, 2015, for Canadian Patent Application No. 2,783,842.

\* cited by examiner

*Primary Examiner* — Thomas Truong
(74) *Attorney, Agent, or Firm* — Patterson & Sheridan, LLP

(57) ABSTRACT

A rotor for a submersible motor includes a shaft and a hub. The hub is: disposed around the shaft, torsionally connected to the shaft, and made from a magnetically permeable metal or alloy. The rotor further includes permanent magnets disposed around the hub; and a polymer shroud encapsulating the permanent magnets and molded to the hub.

7 Claims, 6 Drawing Sheets

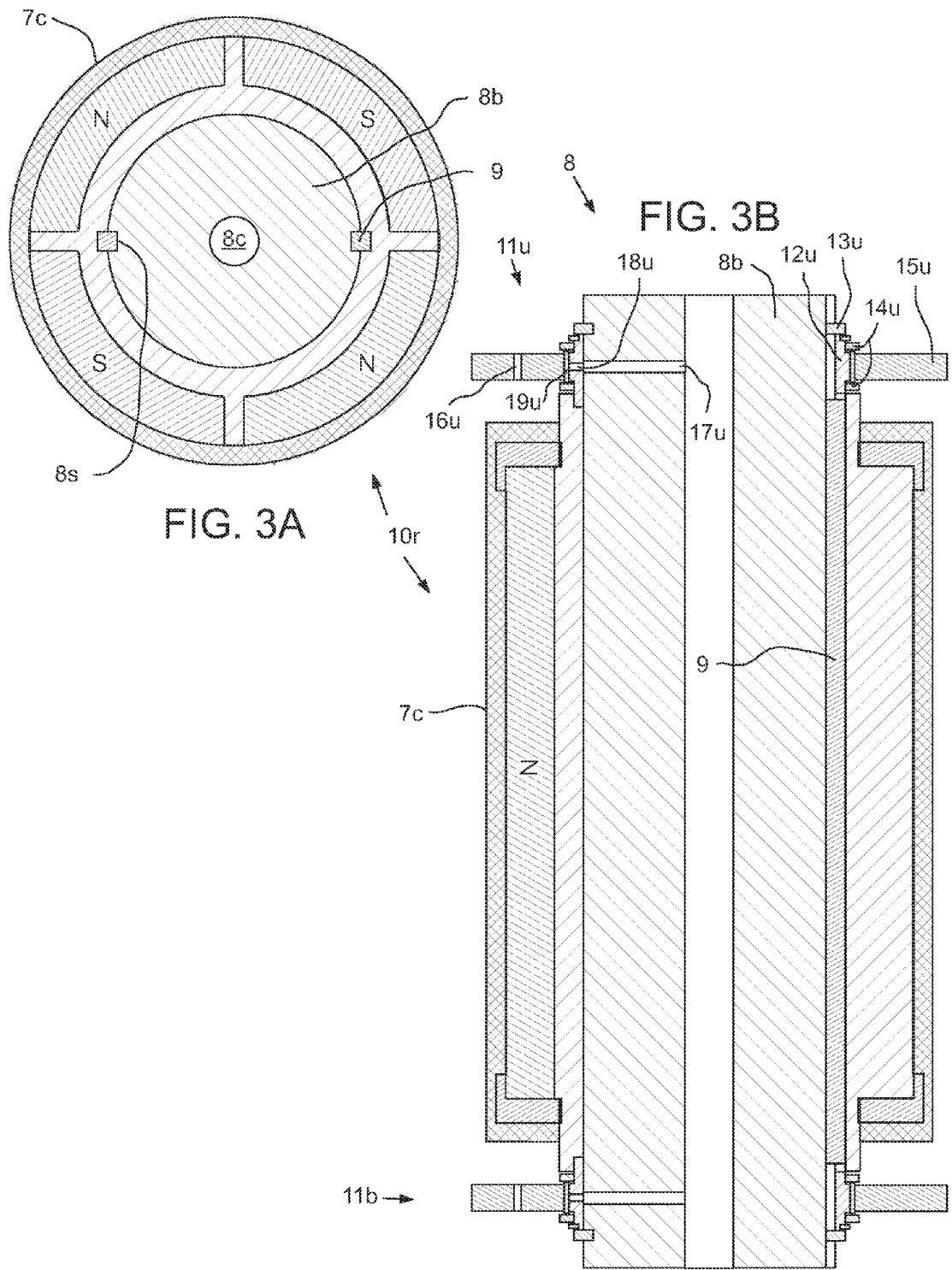

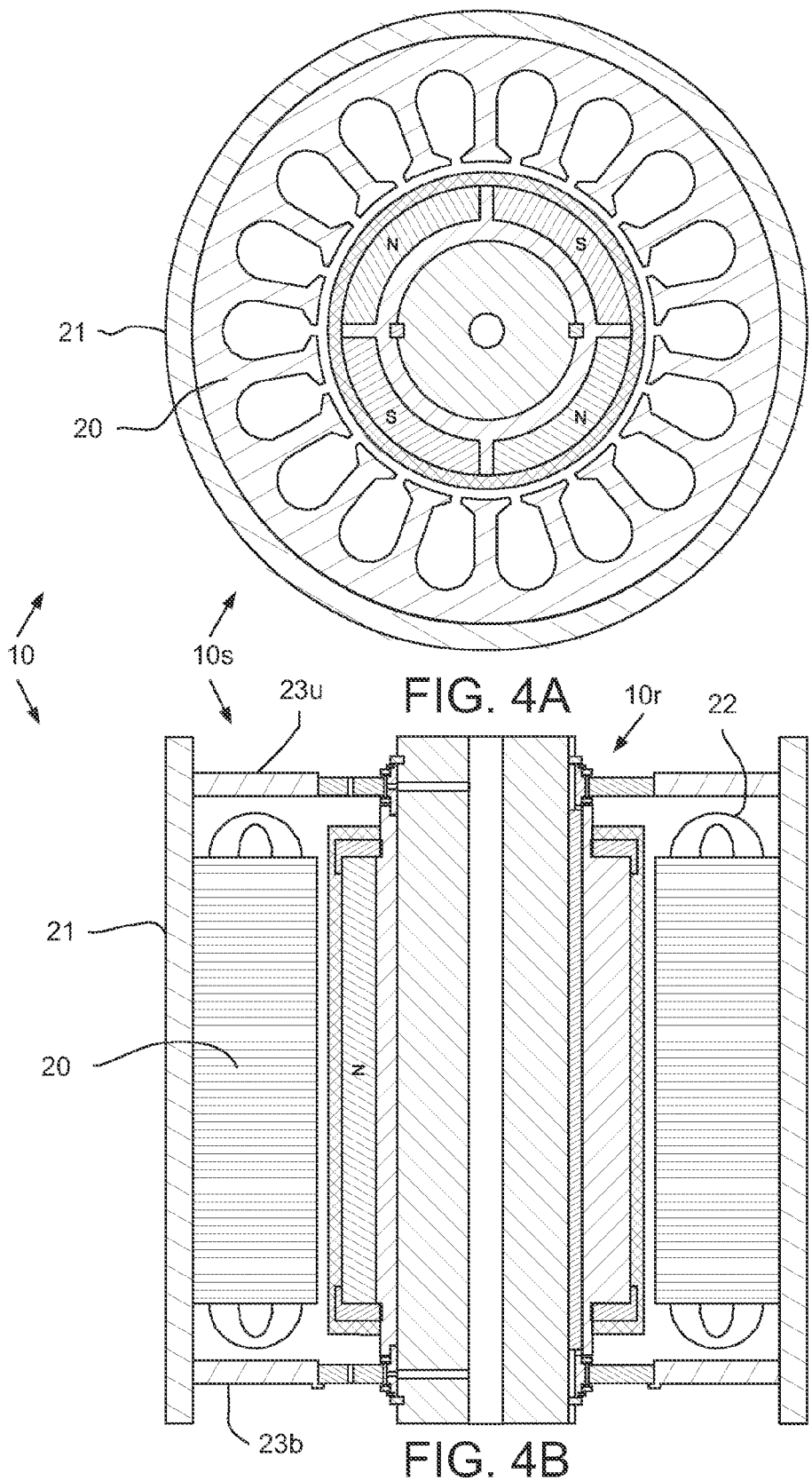

ENCAPSULATED ROTOR FOR PERMANENT MAGNET SUBMERSIBLE MOTOR

BACKGROUND OF THE INVENTION

1. Field of the Invention

Embodiments of the present invention generally relate to an encapsulated rotor for a permanent magnet submersible rotor.

2. Description of the Related Art

Electric submersible pumps (ESPs) are used to extract production fluid, such as crude oil and/or natural gas, from subterranean formations having insufficient pressure to naturally lift the production fluid to surface. ESPs are also used for water supply wells.

One major component of an ESP that has proved difficult to improve is the electric motor. Currently, electric motors used within ESPs are typically induction motors with elongated stator windings. These motors are extremely long, such as over 30 feet in length, and are not capable of having their speed controlled without the use of add-on expensive variable speed drives.

One possible replacement for the induction motor is the permanent magnet motor. Modern high performance magnet alloys are brittle materials, exhibiting relatively low strength and corrosion resistance. They are not capable of withstanding centrifugal stress induced by rotation.

SUMMARY OF THE INVENTION

Embodiments of the present invention generally relate to an encapsulated rotor for a permanent magnet submersible rotor. In one embodiment, a rotor for a submersible motor includes a shaft and a hub. The hub is: disposed around the shaft, torsionally connected to the shaft, and made from a magnetically permeable metal or alloy. The rotor further includes permanent magnets disposed around the hub; and a polymer shroud encapsulating the permanent magnets and molded to the hub.

In another embodiment, a method of making a rotor core includes: disposing permanent magnets around a hub made from a magnetically permeable metal or alloy; assembling a mold around the magnets and the hub; and injecting a polymer into the mold, thereby encapsulating the permanent magnets and molding the permanent magnets to the hub.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A and 3B illustrate an assembled rotor having the encapsulated rotor core.

FIGS. 4A and 4B illustrate an assembled permanent magnet submersible motor having the encapsulated rotor core.

DETAILED DESCRIPTION

Figure 1A:
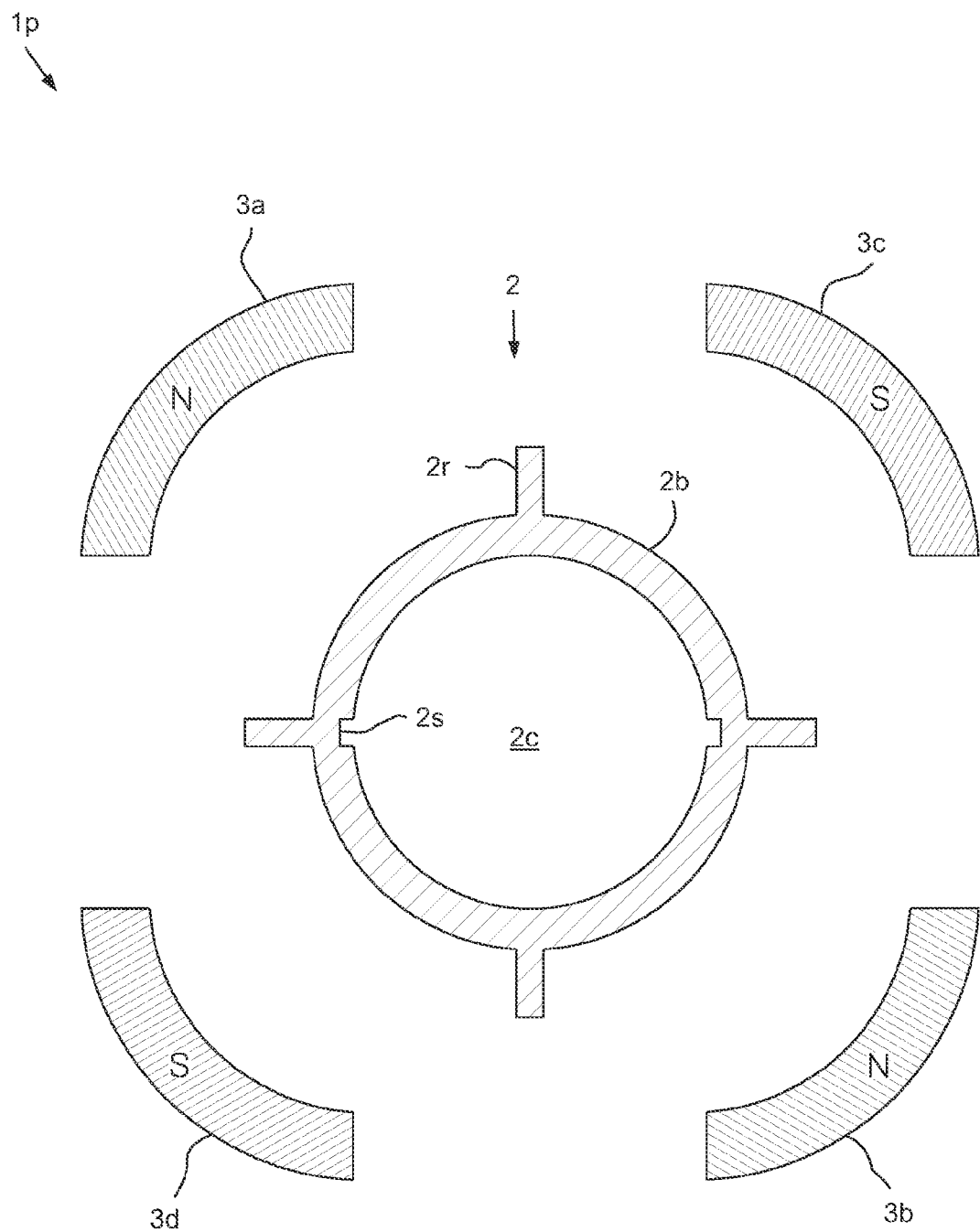
FIGS. 1A-1C illustrate assembly of a rotor core, according to one embodiment of the present invention.
Figure 1B:
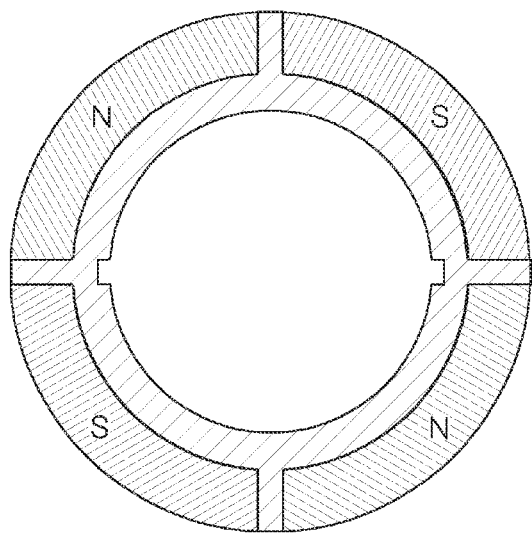
Figure 1C:
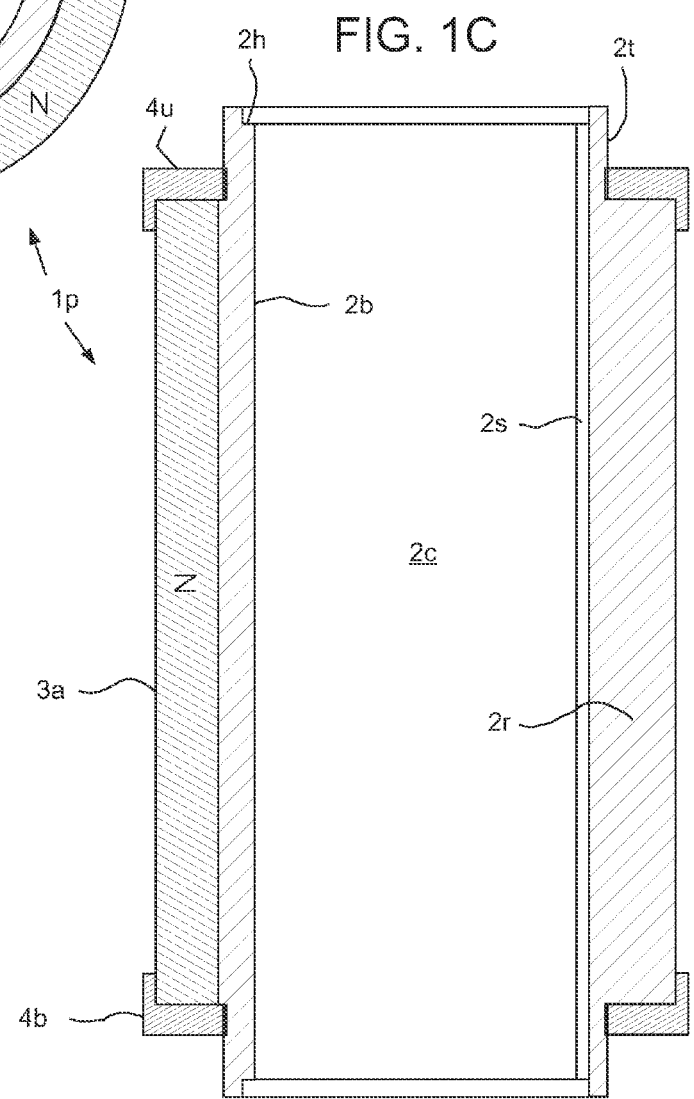

FIGS. 1A-1C illustrate assembly of a rotor core 1p, according to one embodiment of the present invention. The rotor core 1p may include a hub 2, one or more pairs of permanent magnets 3a-d, and one or more retainers 4u,b. The hub 2 may be made from a magnetically permeable metal or alloy, such as electrical steel. The hub 2 may have a tubular body 2b having a bore 2c formed therethrough. The hub 2 may also have a one or more (two shown) slots 2s formed along an inner surface of the body 2b, and two or more (four shown) ribs 2r formed along an outer surface of the body 2b. Each of the ribs 2r may be spaced around the hub body 2b at regular intervals. The ribs 2r may torsionally connect the magnets 3a-d to the hub 2. Pockets may be formed between the ribs 2r. The hub 2 may also have a shoulder 2h formed in an inner surface of the body 2b at each longitudinal end thereof. The hub 2 may also have a shouldered thread 2t formed in an outer surface of the body 2b at each longitudinal end thereof.

The permanent magnets 3a-d may each be made from a (magnetically hard) ferromagnetic metal or alloy, such as alnico or rare earth alloy, such as samarium-cobalt or neodymium. Alternatively, the magnets 3a-d may each be made from a ferrimagnetic material, such as ferrite or a garnet. Each pair of magnets 3a-d may have an opposite polarity N, S. Each magnet 3a-d may be disposed in a respective pocket such that adjacent magnets have alternate poles N, S. Each magnet 3a-d may be polarized in a radial or essentially radial direction. Each magnet 3a-d may have cylindrically-segmented shape such that a continuous outer surface is formed when the magnets are inserted into the respective pockets. Each magnet 3a-d may be unitary (shown) or be formed by a stack of laminations (not shown).

The retainers 4u,b may each be annular, have a threaded inner surface, and have a seat formed therein for receiving respective longitudinal ends of the magnets 3a-d, thereby fastening the magnets to the hub 2 for encapsulation. The retainers 3a-d may each be made from a non-conductive and non-magnetic material, such as a polymer, ceramic, or composite. The retainers 4u,b may longitudinally connect the magnets 3a-d to the hub 2 by abutment therebetween. Each retainer 4u,b may have a base portion and a lip portion. Each lip portion may extend longitudinally from the respective base portion to overlap respective longitudinal ends of the magnets 3a-d, thereby also radially connecting the magnets to the hub 2 for encapsulation. Alternatively, the lip portions may be omitted and magnetic force between the magnets 3a-d and the hub 2 may be utilized to radially connect the magnets and the hubs for encapsulation.

Alternatively, the retainers 4u,b may be omitted and the magnets 3a-d may be retained in the pockets using adhesive or reliance on magnetic force.

Figure 2A:
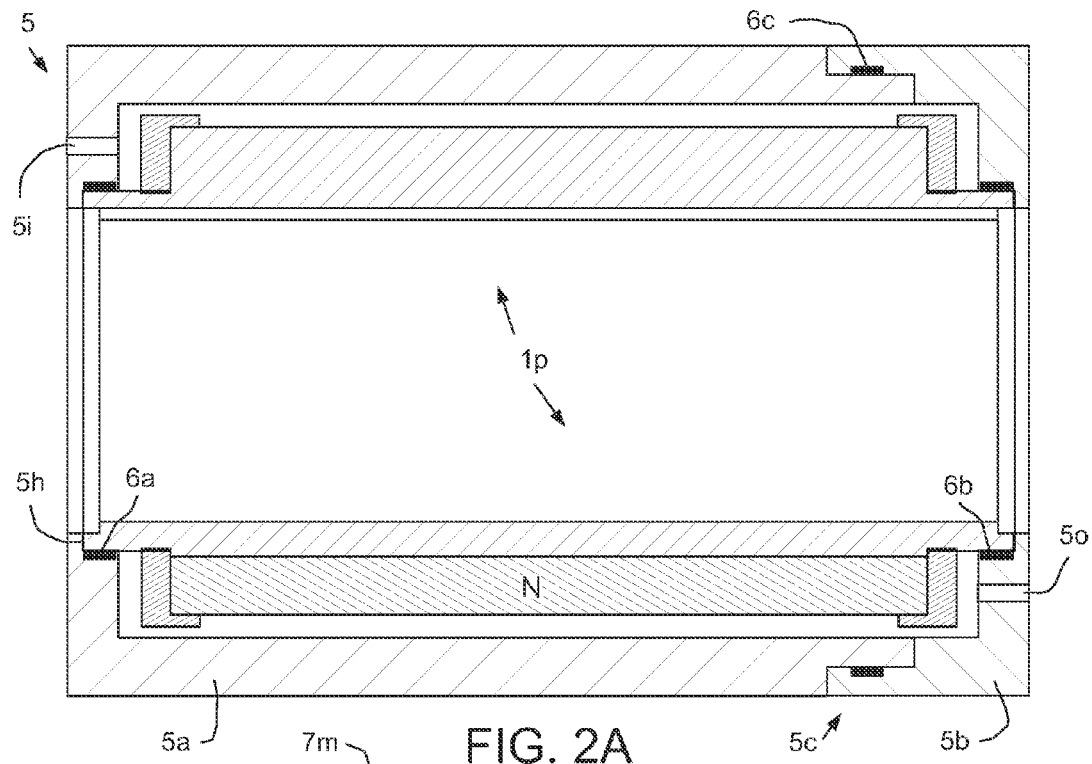
FIGS. 2A and 2B illustrate encapsulation of the rotor core.
Figure 2B:
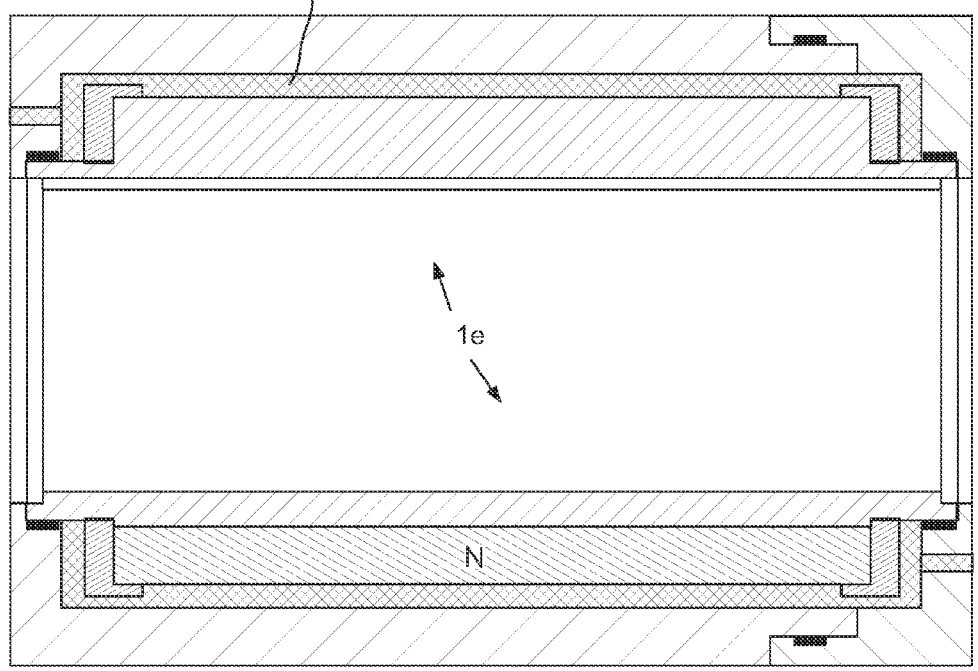

FIGS. 2A and 2B illustrate encapsulation of the rotor core 1p. Once the rotor core 1p has been assembled, a mold 5 may be assembled around the rotor core 1p. The mold 5 may be part of an injection system (rest not shown). The injection system may further include a reaction injector and a pair of supply tanks. The supply tanks may each have a liquid reactive component (aka resin and hardener) stored therein. The supply tanks or the components may or may not be heated. The injection system may further include a pair of feed pumps and a mix head. An inlet of each feed pump may be connected to a respective supply tank. An outlet of each feed pump may be connected to the mix head and an outlet of the mix head may connect to a sprue 5i of the mold 5. The injection system may further include a hydraulic power unit (HPU) for powering the supply pumps. The injection system may further include a controller for proportioning the feed pumps. The feed pumps may be operated to simultaneously supply the liquid reactive components to the mix head. The mix head may impinge the liquid components to begin polymerization of a shroud mixture 7m. The shroud mixture 7m may continue from the mix head into the mold 5.

Alternatively, the injection system may include an injector and an HPU to power the injector. The injector may include a hopper, a barrel, a driver, and a heater. The heater may surround the mold side of the barrel. The driver may be a rotating screw disposed in the barrel. The screw may have a feed section, transition section, and a metering section. The feed section may receive shroud pellets from the hopper and convey them to the transition section. The transition section may compress the pellets into a molten shroud 7m and pump the molten shroud 7m to the metering section. The screw may be supported by a hydraulic ram that is displaced away from the mold by the molten shroud feed through the screw. The hydraulic ram may then reverse to inject the molten shroud 7m into the mold 5. Alternatively, the driver may be a hydraulic plunger and a torpedo spreader.

The mold 5 may include a housing 5a,b and one more seals 6a-c. The housing 5a,b may include first 5a and second 5b sections. The housing sections 5a,b may be connected via mating couplings 5c formed at a longitudinal end of each housing section and sealed by the seal 6c. Each housing section 5a,b may also have a cylindrical portion and a lip portion extending from the cylindrical portion. Each lip portion may have one of a sprue 5i and a vent 5o formed therethrough and a shoulder 5h for engaging a respective longitudinal end of the hub 2. The seals 6a,b may seal the respective mold-rotor core interfaces. An inner diameter of the mold housing cylindrical portions may be slightly greater than an outer diameter of the rotor core 1p, thereby forming a chamber between the mold housing and the rotor core. Each of the sprue 5i and the vent 5o may be in fluid communication with the mold chamber.

The mold 5 may further include an actuator (not shown) and an ejector (not shown). Each of the mold actuator and injector may be hydraulically operated. The mold actuator may be connected to the mold section 5b and the mold ejector may be connected to the mold section 5a. The rotor core 1p may be loaded into the mold section 5a and the actuator operated to close the mold 5 by connecting the section 5b.

Once the mold 5 has been assembled around the rotor core 1p, the mix head may be connected to the sprue 5i. The supply pumps may then be operated to pump the liquid reactants to the mix head. The shroud mixture 7m may continue from the mix head into the mold 5. Air displaced by the sealant mixture 7m may escape through the vent 5o. The shroud mixture 7m may flow around and along the mold chamber. Pumping of the shroud mixture 7m may continue until the mold chamber is filled. The mold 5 may be heated by exothermic polymerization of the shroud mixture 7m. A melting temperature of the mold seals 6a-c may be suitable to withstand the exothermic reaction. Once the shroud mixture 7m has cured 7c and cooled to at least a point sufficient to maintain structural integrity, the mix head may be disconnected from the mold 5 and the mold opened using the mold actuator. The ejector may then be operated to free the encapsulated rotor core 1e from the mold 5.

The shroud 7m,c may be a high strength polymer having a high thermal resistance, such as a thermoplastic, thermoset, or copolymer, such as polyphenylene sulfide (PPS), polyamide, Polyphenyleneether (PPE), Polysulfone, Polyetheretherketone (PEEK), Polyimide, and Polyoxymethylene (POM). The shroud polymer may be non-magnetic and non-conductive. A cylindrical portion of the mold chamber may be sized such that the cured shroud 7c has a strength sufficient to withstand hoop stress exerted by the magnets 3a-d caused by centrifugal force induced by rotation of the rotor core 1e. The mold chamber may also have a lip portion such that the shroud 7m,c encapsulates the magnets 3a-d by deposition on an outer surface of the hub body 2b, thereby protecting the magnets from corrosion by production fluid during operation of the encapsulated rotor core 1e.

Alternatively, the ribs 2r may be omitted and the shroud 7c may also torsionally connect the magnets 3a-d to the hub 2.

FIGS. 3A and 3B illustrate an assembled rotor 10r having the encapsulated rotor core 1e. The rotor 10r may include the rotor core 1e, a shaft 8, and a pair of bearings 11u,b.

The shaft 8 may be made from a non-magnetic metal or alloy, such as stainless steel, a nickel based alloy, or titanium. The shaft 8 may have a rod body 8b having a bore 8c formed therethrough for transporting lubricant (not shown), such as motor oil. The shaft 8 may also have one or more (two shown) slots 8s formed along an outer surface of the body 8b, and a lubricant port 17u formed through a wall of the body for each bearing 11u,b. The shaft slots 8s may be aligned with the respective hub slots 2s, thereby forming keyways. A key 9 may be disposed in each of the respective keyways for torsionally connecting the hub 2 to the shaft 8. The shaft 8 may also have a groove formed in an outer surface of the body 8b adjacent each longitudinal end thereof. Each groove may receive a respective fastener, such as a snap ring 13u, for longitudinally connecting the hub 2 to the shaft 8. The shaft 8 may also have a torsional connector profile (not shown), such as splines, formed in an outer surface of the body 8b at an upper longitudinal end thereof for receiving a shaft coupling (not shown) having mating spline-ways formed in an inner surface thereof for connection of the motor shaft 8 to a shaft of another component of a downhole assembly.

Each bearing 11u,b may include a support 12u, an inner sleeve 19u, an outer sleeve 15u, and a pair of thrust washers 14u. Each support 12u may be made of a thermally insulating material, such as a ceramic or cermet. Each support 12u may have a lubricant passage 16u formed longitudinally therethrough, a lubricant port 18u formed radially therethrough, shoulders formed in an outer surface thereof, and a notch formed in a longitudinal end thereof. The supports 12u may also be longitudinally connected to the shaft 8 by the snap rings 13u. The supports 12u may also be torsionally connected to the shaft 8 by receipt of longitudinal ends of the keys 9 in respective notches. The sleeves 15u, 19u and washers 14u may each be made from a wear-resistant material, such as a Babbitt alloy, ceramic, cermet, bi-metal, or lubricant infused alloy composite. The inner sleeves 19u and/or the outer sleeves 15u may each have lubricant grooves formed in the respective mating surfaces.

Each inner sleeve 19u may be longitudinally and torsionally connected to the respective support 12u, such as by an interference (i.e., press) fit. A first thrust washer 14u of each pair may be longitudinally connected to the shaft 8 by entrapment between an end of the respective inner sleeve 19u and a respective longitudinal end of the hub body 2b and a second thrush washer 14u of each pair may be longitudinally connected to the shaft 8 by entrapment between another end of the respective inner sleeve and a fastener, such as a snap ring, connected to the support 12u. Each outer sleeve 15u may be longitudinally connected to the shaft 8 by entrapment between a respective pair of the thrust washers 14u.

To assemble the rotor 10r, the lower snap ring may be fastened in the respective shaft groove. The lower bearing 11b may then be slid onto the shaft 8 until contact is made with the lower snap ring. The keys 9 may then be slid into the respective shaft slots 8s and the notches of the lower bearing support aligned therewith. The encapsulated rotor core 1e may be aligned with the keys 9 and slid onto the shaft 8 until the respective shoulder 2h is received by an upper end of the lower bearing support. The upper bearing 11u may then be slid onto the shaft 8 and aligned with the keys until contact is made with the respective shoulder 2h. The upper snap ring 13u may then be fastened in the respective shaft groove.

FIGS. 4A and 4B illustrate an assembled permanent magnet submersible motor 10 having the encapsulated rotor core 1e. The motor 10 may include the rotor 10r and a stator 10s.

The stator 10s may include a housing 21, a core 20, two or more windings 22, such as three (two shown), and a pair of bearing receivers 23u,b. The housing 21 may be tubular and have a bore formed therethrough. The housing 21 may be made from any of the shaft materials, discussed above. The housing 21 may have a coupling (not shown), such as flange, formed at each longitudinal end thereof. Each flange may connect to a mating flange of a housing of another component of the downhole assembly (bottom flange may connect to end cap) using threaded fasteners, such as bolts or studs and nuts or sockets, thereby longitudinally and torsionally connecting the components. Each flange may also have nose (male) or seal face (female) for carrying/receiving a seal, thereby sealing the component interfaces.

The core 20 may be made from a magnetically permeable metal or alloy, such as electrical steel. The core 20 may include multiple lobes forming slots therebetween for receiving the windings 22. The core 20 may be formed by a stack of laminations. Each winding 22 may include a length of wire wound through a portion of the slots and having a conductor and a jacket. The conductor may be made from an electrically conductive metal or alloy, such as aluminum, copper, or alloys thereof. The jacket may be made from an insulating polymer, such as PEEK or polyimide. The windings 22 may be delta or wye-connected. The core 20 may be longitudinally and torsionally connected to the housing 21, such as by an interference fit.

Each bearing receiver 23u,b may be longitudinally and torsionally connected to the housing 21, such as by an interference fit. To assemble the motor 10, the rotor 10r may be inserted into the stator 10s until the outer bearing sleeves 15u engage the respective receivers 23u,b. The outer bearing sleeves 15u may then be pressed into the respective receivers 23u,b.

Figure 5:
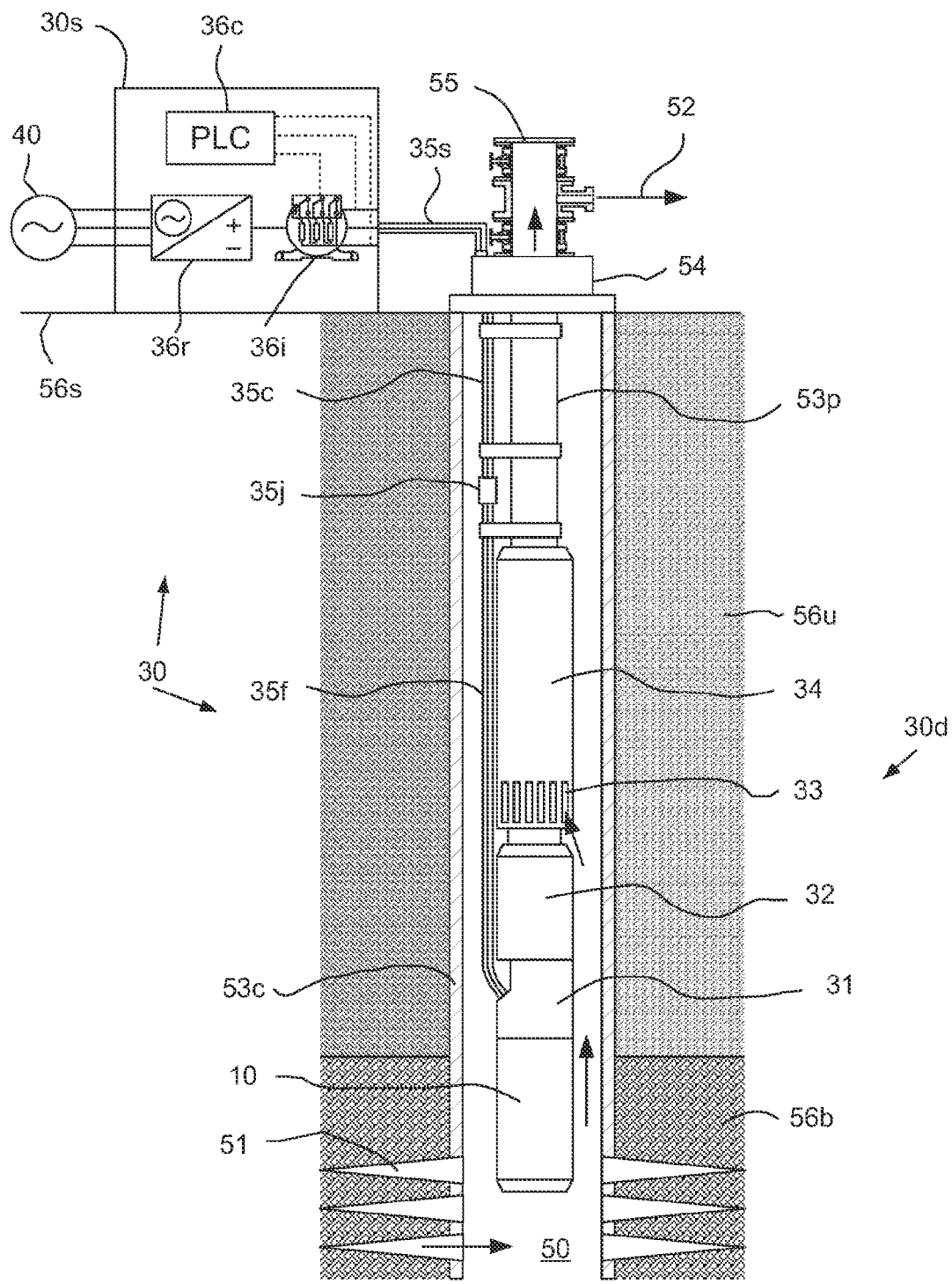
FIG. 5 illustrates an artificial lift system (and operation thereof) having the encapsulated rotor core.

FIG. 5 illustrates an artificial lift system (ALS) 30 (and operation thereof) having the encapsulated rotor core. The ALS 30 may include a motor driver 30s and a downhole assembly 30d. The downhole assembly 30d may be suspended from production tubing 53p disposed in a cased 53c wellbore 50 that extends from a surface 56s of the earth, through a non-productive formation 56u, and penetrates a productive formation 56b. The casing may be perforated 51 to provide fluid communication between the productive formation 56b and the casing bore. The downhole assembly 30d may include the motor 10, a motor head 31, a shaft seal 32, and a pump 34. As discussed above, housing and shafts of each component may be connected.

The pump 34 may be centrifugal, such as a radial flow or mixed axial/radial flow centrifugal pump. The pump 34 may include one or more stages. Each stage may include an impeller and a diffuser. Each impeller may be longitudinally and torsionally connected to the pump shaft and each diffuser may be longitudinally and torsionally connected to the pump housing. Rotation of each impeller by the pump shaft may impart velocity to the production fluid 52 and flow through the stationary diffuser may convert a portion of the velocity into pressure. The pump 34 may deliver the production fluid 52 to the production tubing 53p via a discharge head. Alternatively, the pump 34 may be a positive displacement pump, such as a gear pump, vane pump, or progressive cavity pump.

The shaft seal 32 may isolate the production fluid 52 being pumped through the pump 34 from the lubricant in the motor 10 by equalizing the lubricant pressure with the pressure of the production fluid 52. The shaft seal 32 may include a mechanical seal, an elastic fluid-barrier bag, or a labyrinth of tube paths extending between a lubricant chamber and a pumping chamber providing limited fluid communication between the chambers. The shaft seal 32 may also include a thrust bearing capable of supporting thrust load from the pump 34.

An inlet 33 of the pump 34 may include a plurality of ports formed through the pump housing for allowing production fluid 52 to enter a lower or first stage of the pump and a screen to filter particulates from the production fluid. Alternatively, the inlet 33 may be a separate component, such as a static gas separator or rotary gas separator depending on the gas content of the production fluid 52.

The motor driver 30s may provide power and control to the motor 10. A surface cable 35s may connect from the motor driver 30s to a wellhead 54. The surface cable 35s may connect to a penetrator at the wellhead 54. The penetrator may connect the surface cable 35s to a downhole cable 35c. The downhole cable 35c may extend down a length of the production tubing 53p and may be fastened to the production tubing 53p at various intervals. The downhole cable 35c may terminate at a splice 35j located adjacent the downhole assembly 30d. The splice 35j may connect the downhole cable 35c to a motor lead extension (MLE) cable 35f. The MLE cable 35f may be flat to fit in an annulus formed between the pump 34 and the casing 53c. The MLE cable 35f may terminate at a pothead of the motor head 31. The pothead may connect the MLE cable to internal leads (not shown) connected to the stator windings 22. Each cable 35s,c,f may include a conductor for each phase of the motor (i.e., three), an insulating jacket for each conductor, a fluid barrier, a buffer, and armor.

Alternatively, the downhole assembly may include a second (or more) motor stacked in tandem with the motor 10 and/or the motor 10 may include one (or more) additional stages.

The motor driver 30s may include a rectifier 36r, an inverter 36i, and a programmable logic controller (PLC) 36c, and one or more sensors (not shown), such as a voltmeter and one or more ammeters. The motor driver 30s may receive a three phase alternating current (AC) power signal from a utility grid or generator 40. The rectifier 36r may convert the three phase AC power signal to a direct current (DC) power signal and supply the converted DC power signal to the inverter 36i. The inverter 36i may have an output for each phase (i.e., three) of the motor 10 and may modulate the DC power signal to drive each phase of the stator 10s based on control signals from the PLC. The sensors may measure voltage and current of one or more of the inverter outputs and be in data communication with the PLC 36c.

The PLC 36c may execute a program for commissioning the motor 10 to obtain necessary parameters for model-based back electromotive force (BEMF) control of the motor. The PLC 36c may begin the commissioning program by applying a high-speed rotational vector to the stator 10s to generate a rotating magnetic field about the stator and having low strength so the rotor 10r remains stationary and monitoring the currents at the stator windings 22 to determine the angle of the rotor magnetic axis. The PLC 36c may then apply a test voltage to the stator windings 22 and measure the resulting current to determine stator resistance. The PLC 36c may then apply opposite polarity and equal amplitude pulses along the rotor magnetic axis and monitor a current peak to determine magnet direction and d-axis self inductance. The PLC 36c may then apply a pulse set to the stator windings 22 perpendicular to the rotor magnetic axis and determine q-axis self inductance from the resulting current waveform. The PLC 36c may then apply a rotating field to rotate the rotor 10r at a frequency that captures the rotor and monitor d-axis current to calculate flux linkage.

The PLC 36c may utilize data from the commissioning program to execute a BEMF model of the motor 10 for estimating a position of the rotor 10r. The PLC 36c may use the estimated rotor position to control the inverter 36i such that the frequency of the power signals supplied to the stator windings 22 match the frequency of the rotation of the magnetic field in the rotor 10r. The PLC 36c may iteratively repeat the estimating and control in real time.

The PLC 36c may sample current supplied to the motor 10 from the inverter 36i and convert the current samples from three phase components into two phase components of a stationary reference frame. The PLC 36c may convert the stationary reference two phase components into synchronous frame feedback signals having a d-axis component and a q-axis component using the estimated rotor position. The PLC 36c may then process the feedback signals and output voltage reference signals in the synchronous frame using the estimated rotor position. The PLC 36c may then convert the voltage reference signals back to the stationary reference frame using the estimated rotor position. The PLC 36c may then convert the stationary reference frame voltage signals to three-phase components. The PLC 36c may then utilize the three-phase voltage reference signals to generate control signals for the inverter. The PLC 36c may use the stationary reference voltages and currents, the q-axis inductance, and motor resistance to calculate equivalent EMF. The PLC 36c may then mathematically processes the equivalent EMF to obtain the estimated rotor position.

Alternatively, the motor driver 30s and the motor head 31 may each include a transformer (not shown). The motor driver transformer may increase voltage of the modulated power signals for transport along the cables 35s,c,f and the motor head transformer may reduce the voltage for delivery to the stator 10s.

In operation, the motor driver 30s may supply the motor 10 with the modulated power signals via the cables 35s,c,f to torsionally drive the rotor 10r. The rotor 10r may in turn torsionally drive the pump shaft. The pump 34 may draw production fluid 52 from the perforations 51, along the motor 10, motor head 31, and shaft seal 32, and into the inlet 33. The motor 34 may then discharge the production fluid 52 into the production tubing 53p. The production tubing 53p may then transport the production fluid 52 through the wellhead 54 and to a production tree 55.

Alternatively, a production packer (not shown) may be set between the production tubing 53p or downhole assembly 30d (above the inlet 33) and the casing 53c.

While the foregoing is directed to embodiments of the present invention, other and further embodiments of the invention may be devised without departing from the basic scope thereof, and the scope thereof is determined by the claims that follow.

The invention claimed is:

1. A rotor for a submersible motor, comprising:
a shaft;
a hub:
    disposed around the shaft,
    torsionally connected to the shaft, and
    made from a magnetically permeable metal or alloy;
permanent magnets disposed around the hub;
a polymer shroud encapsulating the permanent magnets and molded to the hub; and
retainers made from a non-magnetic and non-conductive material and longitudinally connecting the permanent magnets to the hub for encapsulation of the permanent magnets,
wherein:
    the shroud is made from a high strength polymer selected from a group consisting of: polyphenylene sulfide (PPS), polyamide, polyphenyleneether (PPE), polysulfone, polyetheretherketone (PEEK), polyimide, and polyoxymethylene (POM),
    the shroud has a thickness sufficient to withstand hoop stress exerted by the permanent magnets during rotation of the rotor,
    a length of the hub is greater than a length of the shroud,
    the hub has ribs extending from an outer surface thereof and spaced around the outer surface,
    the ribs are rectangular, and
    the permanent magnets are disposed in pockets formed between the ribs.

2. The rotor of claim 1, wherein adjacent permanent magnets have alternate poles.

3. The rotor of claim 1, wherein each permanent magnet is polarized in a radial or essentially radial direction.

4. The rotor of claim 1, wherein the retainers also radially connect ends of the permanent magnets to the hub for encapsulation of the permanent magnets.

5. The rotor of claim 1, wherein the retainers each have a threaded inner surface mated with a respective threaded shoulder the hub.

6. A submersible electric motor, comprising:
the rotor of claim 1 disposed in a stator; and
the stator, comprising:
    a housing;
    a core made from a magnetically permeable metal or alloy; and
    a plurality of windings, each winding comprising electrically conductive wire wound through the core.

7. An artificial lift system, comprising:
the submersible electric motor of claim 6;
a pump having a shaft and a housing; and
a shaft seal torsionally connecting the rotor shaft and the pump shaft.

* * * * *